United States Patent Office 3,040,058
Patented June 19, 1962

3,040,058
6,6,7,7 - TETRAFLUORO - 5,5 - DIHALO - 1 - OXA-SPIRO[3.3]HEPTANES AND PROCESS FOR THEIR PRODUCTION
David C. England, Wilmington, Del., assignor to E. I. du Pont de Nemours and Company, Wilmington, Del., a corporation of Delaware
No Drawing. Filed Feb. 9, 1959, Ser. No. 791,842
19 Claims. (Cl. 260—333)

This invention relates to, and has as its principal objects provision of, novel polyfluoro-1-oxaspiro[3.3]-heptanes and a method for the preparation of the same.

Cycloaddition of polyfluoroolefins with other coreactants containing carbon-carbon ethylenic unsaturation to form products containing four-membered rings is well known—see, for instance, U.S. Patent 2,462,345. In this cycloaddition reaction, a wide variety of substituent functions can be present pendent on the ethylenic carbons of the coreactant for the polyfluoroolefin. Included in these permitted functions is the ketone group, i.e., the oxocarbonyl group, which goes through the reaction unchanged. For instance, tetrafluoroethylene and methyl vinyl ketone result in the formation of 1-acetyl-2,2,3,3-tetrafluorocyclobutane.

Surprisingly, in view of these teachings, it has recently been discovered—see the copending and coassigned application of Coffman and Harris, Serial No. 766,390, filed October 10, 1958—that the polyfluoroperhalocyclobutanones undergo a cycloaddition reaction with polyfluoroolefins of three carbons and up to form a new class of spirooxetanes wherein the substituent group on the ethylenic carbons of the polyfluoroolefin forming the whole polyfluoroolefin molecule of three carbons and up is present on the ring carbon of the oxetane ring adjacent the spiro carbon. Thus, these new products are for instance 3-polyfluorohydrocarbon-2,2,3,5,5,6,6,7,7-nonafluoro-1-oxaspiro[3.3]heptanes. It has been found necessary that this reaction be carried out with ultraviolet light. Attempts to run the cycloaddition reaction with heat alone have failed and no difference has been seen, except the undesirable one of an increase in formation of by-product polymer, when the reaction was effected in the presence of both ultraviolet light and heat.

Contrary to all these teachings, it has now been surprisingly found that a cycloaddition reaction can be effected between polyfluoroperhalocyclobutanones with coreactants carrying a single terminal carbon-carbon ethylenic double bond in which one and only one of the doubly-bonded ethylenic carbons is directly bonded to oxygen, including singly in the case of ethers and esters and doubly in the case of the ketenes, wherein the cycloaddition reaction is not only effected thermally in the absence of ultraviolet light, but furthermore cannot be effected at all by use of ultraviolet light. A still further surprising difference is that in the cycloaddition reaction product the radical pendent on the ethylenic carbons of the coreactant is found pendent on the ring carbons of the oxetane moieties directly opposite the spiro carbon or carbons and not adjacent thereto.

These new products are spiro compounds containing two four-membered rings: one, a polyfluoroperhalocyclobutane ring and the other an oxetane ring wherein annular oxygen is directly attached to the spiro carbon and to ring carbon which in turn is attached to exocyclic oxygen, any substituents on the remaining carbons of the oxetane ring being halogen, hydrogen, as usual, not being considered a substituent. Alternatively, these new products can be described as 5,5-dihalo-6,6,7,7-tetrafluoro-1-oxaspiro[3.3]heptanes in which the 2-carbon is bonded directly to exocyclic oxygen, said bonding being either double, in which case the linkage is an oxocarbonyl linkage, or single in which case the linkage is to an oxygen, the remaining valence of which is bonded singly to a monovalent hydrocarbon radical, in which case the oxetane ring must be perhalogenated, or singly to the carbonyl carbon of a monovalent hydrocarboncarbonyl radical. Thus, the products of this invention can be described as 5,5-dihalo-6,6,7,7-tetrafluoro-2-hydrocarbonoxy-, 2-hydrocarboncarbonyloxy-, or -2-oxo 1-oxaspiro-[3.3]heptanes wherein the halogens are of atomic number from 9 to 35, alike or different, and the monovalent hydrocarbon radicals are generally of no more than eight carbons each and are free of aliphatic unsaturation.

The fundamental effect that the oxygen linked directly to the ethylenic carbon of the coreactant has on the mode of the reaction also carries over to the products. As stated above, the carbon of the terminal ethylenic coreactant to which the oxygen is linked becomes the 2-carbon in the oxetane ring and not the 3-carbon as is the case of the substituent in the above-described copending application of Coffman and Harris. Accordingly, in the oxetane ring of the present products the carbon carrying the exocyclic oxygen substituent is adjacent the oxetane ring oxygen. Such a structure renders the 2-oxygen - substituted-5,5-dihalo - 6,6,7,7-tetrafluoro-1-oxaspiro[3.3]heptanes much more reactive and accordingly more useful as chemical intermediates in the ready preparation of other new and useful products. This is especially true in those instances wherein the 2-oxy substituent is a hydrocarbacyloxy substituent, which products arise from the cycloaddition reaction between and across the oxocarbonyl group of the polyfluoroperhalocyclobutanones and the vinyl esters of carbacyl acids, particularly the vinyl esters of hydrocarbon monocarboxylic acids. Such products of this invention, i.e., the 2-hydrocarboncarbonyloxy-5,5 - dihalo-6,6,7,7 - tetrafluoro-1-oxaspiro[3.3]heptanes, are easily and sometimes spontaneously converted by catalytic quantities of acid, preferably with heat, to the isomeric α-(1-hydrocarboncarbonyloxy-2,2 - dihalo - 3,3,4,4 - tetrafluorocyclobutyl)-acetaldehydes.

The products where the exocyclic oxygen substituent is present in a hydrocarbon ether group, i.e., a hydrocarbonoxy group, and in which therefore the oxetane ring is perhalogenated are also quite useful as chemical intermediates in that simple acid hydrolysis forms the previously unobtainable α-(1-hydroxypolyfluoroperhalocyclobutyl)acetic acids and the esters thereof wherein the hydrocarbonoxy ester group is the hydrocarbonoxy ether group of the oxaspiroheptanes. These hydroxy-polyfluoroperhalocyclobutyl acetic acids and esters are particularly outstanding as novel polyester intermediates of the general type described in U.S. Patent 2,855,386.

Those products wherein the exocyclic oxygen is present in an oxocarbonyl substituent, i.e., where the exocyclic oxygen is doubly directly linked to the 2-carbon of the oxetane ring, are useful in still another field since these compounds usually spontaneously polymerize and in any event can be polymerized thermally to a new class of useful resins.

These oxaspiroheptanes and oxooxaspiroheptanes, as well as the synthesis thereof, and the use thereof in forming other useful reactive chemical entities and/or polymers and resins are illustrated in the following three equations: (1) wherein the requisite exocyclic oxygen is doubly bonded to the oxetane ring; (2) wherein the exocyclic oxygen is singly bonded to the oxetane ring with the second valence of the exocyclic oxygen being satisfied by a monovalent hydrocarbon radical free of aliphatic unsaturation, i.e., aliphatically saturated, which oxetane ring is therefore polyhalogenated; and (3) wherein the exocyclic oxygen is singly bonded to the oxetane ring with the remaining valence of the exocyclic oxygen being satisfied by linkage to the carbonyl carbon of a monovalent hydrocarboncarbonyl radical free of aliphatic unsaturation. In these equations and structural formulas, the following symbology is used: X indicates halogen of atomic number from 9-35, alike, or different; the A's, alike or different, indicate hydrogen or X; and the R's, alike or different, represent monovalent hydrocarbon radicals free of aliphatic unsaturation, i.e., aliphatically saturated, and of no more than eight carbons each:

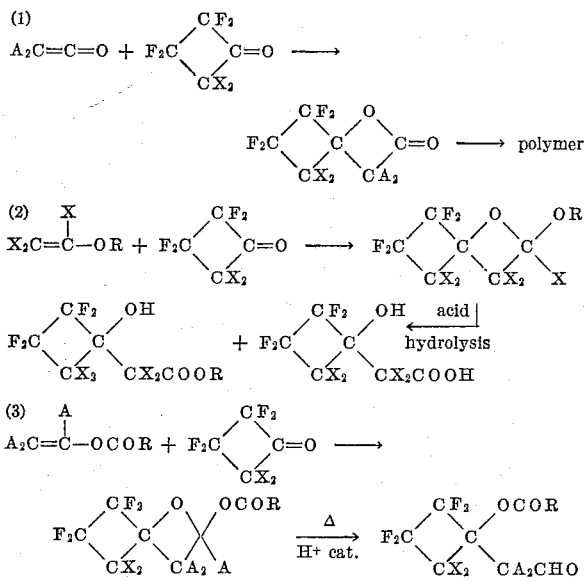

EXAMPLE I

The new compounds of the present invention and the preparation thereof are illustrated in greater detail in the following more specific but nonlimiting examples in which the parts given are by weight.

A thick-walled glass reactor approximately 23 diameters long and of internal capacity corresponding to about 150 parts of water was evacuated, cooled in a liquid nitrogen bath, and charged with 47 parts of perfluorocyclobutanone (preparable by the method of Example IV of my copending application S.N. 717,805, now abandoned) and 40 parts (1.4 molar proportions based on the ketone) of methyl trifluorovinyl ether. The reactor was sealed and then allowed to warm to room temperature. A slightly exothermic reaction occurred when the reactor reached room temperature. After being heated overnight at steam bath temperatures, the sealed reactor was then cooled in a liquid nitrogen bath, opened, and the reaction mixture then separated by distillation. There was thus obtained 70 parts (91% of theory) of 2,3,3,5,5,6,6,7,7-nonafluoro-2-methoxy - 1 - oxaspiro[3.3]heptane as a clear, colorless liquid boiling at 98° C. at atmospheric pressure; $n_D^{25}$, 1.3070.

*Analysis.*—Calcd. for $C_7H_3O_2F_9$: C, 29.0%; H, 1.0%; F, 59.0%. Found: C, 29.2%; H, 1.3%; F. 58.7%.

The methoxy perfluorooxaspiroheptane was further characterized by acidic hydrolysis. Thus, 80 parts of the 2,3,3,5,5,6,6,7,7-nonafluoro-2-methoxy - 1 - oxaspiro [3.3]heptane was added dropwise to about 150 parts of concentrated sulfuric acid, with stirring and cooling sufficient to keep the temperature of the reaction mixture at 55–60° C. Slight warming was needed at the beginning of the reaction to start the exothermic reaction. After completion of the addition, crystals separated when the clear solution was cooled. It was diluted to a total volume of about 350 parts with ice while the temperature of the reaction mixture was maintained below 50° C. The resultant aqueous reaction mixture was extracted with diethyl ether, the ether extracts were dried over anhydrous magnesium sulfate, and the diethyl ether was removed by distillation. Upon distillation there was obtained from the residue 49.3 parts (62% of theory) of methyl α-(2,2,3,3,4,4-hexafluoro-1-hydroxycyclobutyl)-α,α-difluoroacetate as a clear, colorless liquid boiling at 75° C. under a pressure corresponding to 20 mm. of mercury, which solidified on standing, and 13.6 parts (18% of theory) of α-(2,2,3,3,4,4-hexafluoro-1-hydroxycyclobutyl)-α,α-difluoroacetic acid as a clear, colorless liquid boiling at 104° C. under a pressure corresponding to 20 mm. of mercury, which also solidified on standing.

The methyl ester was recrystallized from n-hexane. There was thus obtained pure methyl α-(2,2,3,3,4,4-hexafluoro-1-hydroxycyclobutyl)-α,α-difluoroacetate as white crystals melting at 53–55° C. The infrared and n-m-r spectra were wholly consistent with the methyl hexafluorohydroxycyclobutyldifluoroacetate structure.

*Analysis.*—Calcd. for $C_7H_4O_3F_8$: C, 29.2%; H, 1.4%; F, 52.8%. Found: C, 29.6%; H, 1.5%; F. 53.5%.

The free acid was very hygroscopic. After recrystallization from carbon tetrachloride, the pure α-(2,2,3,3,4,4-hexafluoro - 1 - hydroxycyclobutyl)-α,α-difluoroacetic acid was obtained as white crystals melting at 72–74° C. The infrared and n-m-r spectra were wholly consistent with the hexafluorohydroxycyclobutyldifluoroacetic acid structure.

*Analysis.*—Calcd. for $C_6H_2O_3F_8$: C, 26.3%; H, 0.7%; F, 55.5%. Found: C, 26.9%; H, 0.8%; F, 55.7%.

EXAMPLE II

As in Example I a cylindrical glass reactor was charged with 20 parts of perfluorocyclobutanone and 12 parts (2.6 molar proportions based on the ketone) of monomeric ketene. The reactor was sealed, allowed to warm to room temperature, and held for 60 hours under these conditions. The reactor was cooled in a liquid nitrogen bath, opened, and the crude dark reaction product purified by distillation. There was thus obtained 13.5 parts (42.2% of theory) of crude 5,5,6,6,7,7-hexafluoro-2-oxo-1-oxaspiro [3.3]heptane as a clear, colorless liquid boiling at 45–47° C. under a pressure corresponding to 30 mm. of mercury; $n_D^{25}$, 1.3613–1.3472. Three fractions totalling 6.5 parts exhibited a constant boiling point of 47° C. under a pressure corresponding to 30 mm. of mercury and a refractive index ($n_D^{25}$) 1.3472. All the fractions collected, including the first two of the above-mentioned heart cut, polymerized in the order that they were collected after standing from one to 24 hours. The last fraction (three parts) remained liquid, and infrared and n-m-r spectra obtained thereon were fully consistent with the 5,5,6,6,7,7-hexafluoro-1-oxaspiro[3.3]-heptane-2-one structure.

*Analysis.*—Calcd. for $C_6H_2F_6O_2$: C, 32.8%; H, 0.9%; F, 51.8%. Found: C, 33.3%; H, 1.1%; F, 51.2%.

This analytical sample, i.e., the residue thereof, in a separate vial polymerized spontaneously after standing for about two weeks at room conditions.

EXAMPLE III

As in Example I a cylindrical glass reactor was charged with 27 parts of perfluorocyclobutanone and 26 parts (2.0 molar proportions based on the ketone) of vinyl acetate and 0.5 part of hydroquinone stabilizer. The sealed reactor was allowed to warm to room temperature and to stand at these conditions for 50 hours. The reactor was then cooled in a liquid nitrogen bath, opened, and the reaction mixture purified by distillation. There was thus obtained 21.7 parts (54% of theory) of 2-acetyloxy-5,5,6,6,7,7-hexafluoro-1-oxaspiro[3.3]heptane as a clear, colorless liquid boiling at about 42° C. under a pressure corresponding to 1 mm. of mercury; $n_D^{25}$, 1.3612–1.3681.

The reaction was repeated varying in that 24 parts of perfluorocyclobutanone and 12 parts (an equimolar proportion based on the ketone) of vinyl acetate were used and the sealed reactor was heated at steam bath temperatures for 60 hours. The reactor was cooled, opened, and the reaction mixture purified by distillation. There was thus obtained 23 parts (64% of theory) of 2-acetyloxy-5,5,6,6,7,7-hexafluoro-1-oxaspiro 3,3]heptane as a clear, colorless liquid boiling at 65–69° C. under a pressure corresponding to 10 mm. of mercury; $n_D^{25}$, 1.3642–1.3658. Refractionation of a composite of crudes from several such preparations afforded pure 2-acetyloxy - 5,5,6,6,7,7 - hexafluoro - 1 - oxaspiro[3.3]-heptane as a clear, colorless liquid boiling at 69° C. under a pressure corresponding to 10 mm. of mercury; $n_D^{25}$, 1.3612. The infrared and n-m-r spectra were wholly consistent with the acetyloxyhexafluorooxaspiroheptane structure.

*Analysis.*—Calcd. for $C_8H_6F_6O_3$: C, 36.4%; H, 2.3%; F, 43.2%. Found: C, 36.9%; H, 2.4%; F, 43.0%.

The acetyloxyhexafluorooxaspiroheptane was further characterized through transformation by heating with catalytic amounts of acid, e.g., acetic acid, to the nonspiro isomer, α - (1 - acetyloxyhexafluorocyclobutyl)acetaldehyde, which was obtained as a clear, colorless liquid boiling at 61° C. under a pressure corresponding to 10 mm. of mercury; $n_D^{25}$, 1.3659. The infrared and nuclear magnetic resonance spectra were fully consistent with the acetyloxyhexafluorocyclobutylacetaldehyde structure.

*Analysis.*—Calcd. for $C_8H_6F_6O_3$: C, 36.4%; H, 2.3%; F, 43.2%. Found: C, 36.2%; H, 2.4%; F, 43.8%.

The acetyloxyhexafluorocyclobutylacetaldehyde was further characterized by the formation of diphenylhydrazone derivative upon reaction with diphenylhydrazine. The acetyloxyhexafluorooxaspiroheptane did not give such a derivative.

EXAMPLE IV

As in Example I a glass reactor was charged with 40 parts of perfluorocyclobutanone, 33.3 parts (an equimolar proportion based on the ketone) of vinyl benzoate, and 0.5 part of phenothiazine as a polymerization inhibitor. The reactor was sealed and heated at steam bath temperatures. After one-half hour under these conditions, during which time refluxing occurred in the reactor, the reaction mixture on cooling separated into two layers. The reactor was heated for four more hours at steam bath temperatures, at which point refluxing had almost stopped; heating was continued overnight. On cooling to room temperature the reaction mixture solidified. The reactor was cooled in a liquid nitrogen bath and opened; no perfluorocyclobutanone was recovered. The crystalline reaction mixture was rinsed out of the glass reactor with diethyl ether and the ether then removed by evaporation. Recrystallization from carbon tetrachloride afforded 33 parts (45% of theory) of pure 2-benzoyloxy-5,5,6,6,7,7-hexafluoro-1-oxaspiro[3.3]heptane as white crystals melting at 97.0–98.5° C. The infrared spectrum was wholly consistent with the benzoyloxyhexafluorooxaspiroheptane structure.

*Analysis.*—Calcd. for $C_{13}H_8F_6O_3$: C, 47.9%; H, 2.5%; F, 35.0%. Found: C, 48.2%; H, 2.5%; F, 35.0%.

EXAMPLE V

As in Example I a glass reactor was charged with 22.4 parts of vinyl propionate, 0.5 part of hydroquinone polymerization inhibitor, and 40 parts of perfluorocyclobutanone (an equimolar proportion based on the propionate). The reactor was sealed and heated at steam bath temperatures. After two hours under these conditions, the refluxing had essentially stopped and the color of the reaction mixture had changed from light yellow to white. The reactor was heated overnight at steam bath temperatures and then cooled in a liquid nitrogen bath and opened. The liquid reaction mixture was distilled rapidly. There was thus obtained 43 parts (69.5% of theory) of crude product boiling about 75° C. under a pressure corresponding to 10 mm. of mercury; $n_D^{25}$, 1.3691. The crude product was washed with water and fractionated. There was thus obtained 21.5 parts of α - (1 - propionyloxyhexafluorocyclobutyl)acetaldehyde as a clear, colorless liquid boiling at 69° C. under a pressure corresponding to 10 mm. of mercury; $n_D25$, 1.3692. The nuclear magnetic resonance and infrared spectra were wholly consistent with the propionyloxyhexafluorocyclobutylacetaldehyde structure.

*Analysis.*—Calcd. for $C_9H_8F_6O_3$: C, 38.9%; H, 2.9%; F, 41.0%. Found: C, 38.2%; H, 2.9%; F, 41.8%.

As the other product from the precision fractionation there was obtained 21.5 parts of the isomeric 5,5,6,6,7,7-hexafluoro-2-propionyloxy-1-oxaspiro[3.3]heptane as a clear, colorless liquid boiling at 79° C. under a pressure corresponding to 10 mm. of mercury; $n_D^{25}$, 1.3675. The nuclear magnetic resonance and infrared spectra were wholly consistent with the hexafluoropropionyloxyoxaspiroheptane structure.

*Analysis.*—Calcd. for $C_9H_8F_6O_3$: C, 38.9%; H, 2.9%; F, 41.0%. Found: C, 39.1%; H, 3.2%; F, 40.8%.

As in Example III, the hexafluoropropionyloxyoxaspiroheptane can be converted substantially quantitatively by heating with catalytic amounts of acid to the α-(1-propionyloxyhexafluorocyclobutyl)acetaldehyde. The conversion to the aldehyde occurs during distillation and fractionation due to trace quantities of acid resulting from the ester.

EXAMPLE VI

As in Example I a glass reactor was charged with 9.8 parts of 2-chloro-2,3,3,4,4-pentafluorocyclobutanone (preparable by the method of Example VIII of my copending application S.N. 717,805) and 5.6 parts (an equimolar proportion based on the ketone) of methyl trifluorovinyl ether. The reactor was sealed, allowed to warm to room temperature, and then heated at steam bath temperatures for eighteen hours. The reactor was then cooled in a liquid nitrogen bath, opened, and the liquid reaction mixture purified by distillation. There was thus obtained 9.6 parts (62% of theory) of 5-chloro-2,3,3,5,6,6,7,7-octafluoro-2-methoxy-1-oxaspiro[3.3]heptane as a clear, colorless liquid boiling at 111–112° C. at atmospheric pressure. The infrared spectrum was wholly consistent with the chlorooctafluoromethoxyoxaspiroheptane structure.

*Analysis.*—Calcd. for $C_7H_3ClF_8O_2$: C, 27.4%; H, 1.0%. Found: C, 28.2%; H, 1.1%.

This invention is generic to 5,5-dihalo-6,6,7,7-tetrafluoro-1-oxaspiro[3.3]heptanes in which any substituent on carbon of the oxetane ring, hydrogen as usual not being considered a substituent, is halogen and the 2-carbon, i.e., carbon immediately adjacent to the hetero oxygen atom of the oxetane ring, is bonded to exocyclic oxygen either doubly, i.e., in an oxocarbonyl linkage, or singly, in which case the remaining second valence of the exocyclic oxygen is satisfied by linkage to a monovalent hydrocarbon radical, in which case the oxetane ring is perhalogenated, or a monovalent hydrocarbon-carbonyl radical, in which case the oxetane can but does not necessarily contain halogen substituents, both of which radicals are free of aliphatic unsaturation, i.e., are aliphatically saturated, or, stated alternatively, in which any carbon-carbon multiple bonds are aromatic ring bonds. Preferably said monovalent radicals are of no more than eight carbons each. The halogen substituents on the 5-carbon of the cyclobutane ring and optionally present on the 3-carbon of the oxetane ring, and also on the 2-carbon of the oxetane ring when the exocyclic oxygen is bonded thereto only singly, can be alike or different and can be fluorine, chlorine, or bromine, i.e., halogen of atomic number from 9 to 35, and are more preferably fluorine or chlorine, and especially fluorine.

The present invention is likewise generic to the preparation of these new compounds by the direct cycloaddition reaction between the requisite 2,2-dihalo-3,3,4,4-tetrafluorocyclobutanone and the requisite terminal monoethylenically-unsaturated coreactant wherein one and only one of the carbons of the ethylenic group is directly attached to oxygen, any substituents on said ethylenic carbons being halogen and any remaining valence of said oxygen being satisfied by single and direct linkage to hydrocarbon, in which case the ethylenic carbons are perhalogenated, or hydrocarboncarbonyl radicals which are free of aliphatic unsaturation, i.e., are aliphatically saturated, and of no more than eight carbons each. These monoethylenically-unsaturated oxygen-containing coreactants are thus inclusive of ketene and the halogen-substituted ketenes and the perhalovinyl hydrocarbon ethers and the vinyl and halogen-substituted vinyl hydrocarbon esters of monocarboxylic acids, both said ethers and said esters, other than the single ethylenic unsaturation in the requisite vinyl or halovinyl groups, being otherwise hydrocarbon free of aliphatic unsaturation.

In the final 5,5-dihalo-6,6,7,7-tetrafluoro-1-oxaspiro-[3.3]heptanes in which the 2-carbon of the oxetane ring is linked to exocyclic oxygen the hetero oxygen atom in the 1-position is that of the polyfluoroperhalocyclobutanone coreactant. The spiro carbon and the remaining carbons of the polyfluoroperhalocyclobutane ring are likewise those of the cyclobutanone coreactant and the halogen substituents thereon remain the same. The ethylenic carbons of the monoethylenically unsaturated oxygen-containing coreactants become the 2- and 3-carbons of the oxetane ring and any substituents thereon are those present in the monoethylenically unsaturated oxygen-containing coreactant and, as noted above, can only be halogen, hydrogen not being considered as substituent. The oxygen linked to the ethylenic carbon in the oxygen-containing monoethylenically-unsaturated coreactant becomes the exocyclic oxygen bonded to the 2-carbon of the oxetane ring and, similarly, any substituents bonded to said oxygen in said ethylenically unsaturated oxygen-containing coreactant will remain bonded thereto in the final oxaspiro[3.3]heptanes. Accordingly, from ketene and the haloketenes, the exocyclic oxygen in the 2-position will be doubly bonded to the said 2-carbon.

In the case of the perhalovinyl hydrocarbyl ethers, the exocyclic oxygen bonded to the 2-carbon will be singly so bonded with the remaining valence of said exocyclic oxygen being satisfied by linkage to the monovalent hydrocarbon radical of the ether coreactant, which will likewise be free of aliphatic unsaturation. In the case of the vinyl and halovinyl hydrocarbon monocarboxylic acid esters, the exocyclic oxygen in the 2-position will be singly bonded to the said 2-carbon with the remaining valence thereof satisfied by single linkage to the hydrocarboncarbonyl radical free of aliphatic unsaturation of the starting vinyl or halovinyl hydrocarbon monocarboxylic acid ester.

The reaction is a simple one and requires no complicated operating procedures or equipment. Generally the reaction is carried out in sealed reactors, of which the most convenient are glass or glass-lined reactors. Because of the relatively low boiling nature of some of the 2,2-dihalo-3,3,4,4-tetrafluorocyclobutanones and likewise because of the extreme chemical reactivity of these compounds, e.g., with, for instance, water, the reaction will generally be carried out by cooling the reactor to liquid nitrogen temperatures or at least to those of solid carbon dioxide (about —80° C.), charging the particular 2,2-dihalo-3,3,4,4-tetrafluorocyclobutanone involved as well as the oxygen-containing ethylenic coreactant, purging the reaction vessel with nitrogen, sealing, and allowing the reactor to warm slowly to room temperature. With the higher boiling ketones sealed systems are not normally used. The reaction will simply be carried out at the reflux under anhydrous conditions.

The cycloaddition reaction is effected thermally. Depending on the relative reactivity of the cyclobutanones and the oxygen-containing ethylenic coreactants, the necessary reaction temperatures and reaction times will vary. Generally, temperatures from room temperature to about 75–80° C. are required for reaction times of from a few to about 50 to 250 hours. Higher temperatures can be readily used, in which case, as is usual, reaction times needed will be shorter. Temperatures in the range 150–250° C. are effective, under which conditions reaction times required will be only a few hours. In the sealed systems the reaction will be effected at elevated pressures. No externally-applied pressure is required. The simple autogenous pressure of the reactants under the temperature conditions used will suffice. Generally speaking, the yields and conversions are higher and the reaction conditions less rigorous with the wholly acyclic oxygen-containing ethylenic coreactants.

The reaction mixtures are worked up quite simply to obtain the desired products. Thus, at the completion of the reaction, it is only necessary to open the reactor to the atmosphere, distill away any unreacted dihalotetrafluorocyclobutanone and/or oxygen-containing ethylenic coreactant and isolate and purify the desired products by normal distillation or crystallization techniques. Depending on the molecular weight of the halogen substituents, if any, present on the oxetane ring and also with the specific halogen substituents on the cyclobutane ring, as well as the total molecular weight of the exocyclic hydrocarbonoxy or hydrocarboncarbonyloxy substituent, if any, pendent on the 2- of the oxetane ring, the products of the present invention will vary from liquid to solid. The higher molecular weight halogen substituents and the higher molecular weight hydrocarbonoxy and hydrocarboncarbonyloxy substituents will generally be solid; whereas, the compounds having low molecular weight halogens and radical substituents in these positions will vary from relatively low boiling to moderate to high boiling liquids. Also in those instances where the hydrocarbonoxy or hydrocarboncarbonyloxy substituents have one or more aromatic rings, particularly when some of the halogens are bromine or chlorine, the compounds tend to be solids at room conditions.

The liquid products can be purified using conventional distillation equipment. In those instances where there is present a hydrocarboncarbonyloxy substituent on the 2- of the oxetane ring, i.e., the products obtained from the vinyl esters, care should be taken to remove any traces of acid possibly present in the vinyl ester and also to make sure that the reaction conditions are as anhydrous as possible, since, as disclosed in detail in the foregoing, these products upon heating tend to isomerize, particularly in the presence of acid. With this restriction, the liquid products are easily purified. The normally solid products are easily purified by conventional crystallization and recrystallization techniques. Suitable solvents for such use include the halogenated hydrocarbon solvents, such as the various chloro- and polyfluoroalkanes; or the halogenated aromatic hydrocarbons; the aromatic hydrocarbons themselves, sometimes alone or mixed with halogenated alkane solvents, also are effective.

The reaction can be effected properly in the presence or absence of an inert organic reaction medium, which, if present should be anhydrous. Any inert liquid organic diluent can be used and, generally speaking, the most common are the normally liquid hydrocarbons and polyfluorohydrocarbons, including aliphatic and aromatic compounds, such as the hexanes, heptanes, octanes, and the like; benzene, toluene, the xylenes, and the like; cycloaliphatic hydrocarbon solvents, such as cyclohexane, and the like; the polyfluoroaliphatic hydrocarbons, e.g., 1,1,2,2-tetrafluoro-3,3-dimethylbutane and the like; the polyfluoroaliphatic/cycloaliphatic hydrocarbons, e.g., perfluorodimethylcyclohexane and the like. The choice of the particular diluent, if used, is not at all critical and will vary with such other normal variables as the reaction temperature found necessary to effect reaction. In most instances, in order to simplify the reaction, no diluent is used. The requisite 2,2-dihalo-3,3,4,4-tetrafluorocyclobutanone and unsaturated oxygen-containing coreactants are simply mixed as described previously and the product isolated therefrom by distillation after the reaction has been completed. The absence of a diluent generally makes separation of unreacted material and the desired products easier.

From the foregoing it is apparent that in preparing these new polyfluorooxaspiroheptanes there can be used any 2,2-dihalo-3,3,4,4-tetrafluorocyclobutanone wherein the two halogen substituents are of atomic number from 9 to 35, inclusive, i.e., fluorine, chlorine, and bromine, alike or different. More specifically, there can be used perfluorocyclobutanone, 2-chloro-2,3,3,4,4-pentafluorocyclobutanone, 2-bromo-2,3,3,4,4-pentafluorocyclobutanone, 2-bromo-2-chloro-3,3,4,4-tetrafluorocyclobutanone, 2,2,-dichloro-3,3,4,4-tetrafluorocyclobutanone, and 2,2,-dibromo-3,3,4,4-tetrafluorocyclobutanone.

Of these polyfluorocyclobutanones, the various chlorofluorocyclobutanones have been disclosed in U.S. Patents 2,712,554 and -5, although no detailed method for the preparation thereof is given. Perfluorocyclobutanone is a new compound per se and is being claimed in my copending application Serial No. 757,701, filed August 28, 1958, a continuation-in-part of my copending application Serial No. 717,805, filed February 27, 1958. All of these polyfluoroperhalocyclobutanones can be readily prepared by the cycloaddition reaction between perfluorovinyl hydrocarbon ethers with the requisite 1,1-dihalo-2,2-difluoroethylenes followed by hydrolysis of the resultant 1-hydrocarbonoxy - 1,3,3,4,4 - pentafluoro - 2,2 - dihalocyclobutanes, all as disclosed and claimed in detail in my above-referred to copending application Serial No. 717,-805. These cyclobutanones are generally gaseous to liquid, depending on the total molecular weight which varies with the halogens, quite reactive materials which should preferably be handled under anhydrous conditions.

As the cycloaddition coreactant with the just-described 2,2-dihalo-3,3,4,4-tetrafluorocyclobutanones, there can be used any terminal monoethylenically-unsaturated coreactant wherein one and only one of the carbons of the ethylenic unit is bonded directly to oxygen either doubly or singly, with the remaining valences of the single ethylenic group being satisfied in single linkages by hydrogen or halogen or mixtures thereof and in those compounds wherein the said single carbon of the ethylenic unit is bonded to said oxygen by only a single valence with the remaining single valence of the said oxygen being satisfied by a monovalent hydrocarbon radical in which case the ethylenic group is perhalogenated or a hydrocarbon-carbonyloxy radical free of aliphatic unsaturation, i.e., aliphatically saturated, halogenated or not, both said radicals being generally of no more than about eight carbons each. The oxygen-containing ethylenically-unsaturated coreactants are thus generically inclusive of ketene and the haloketenes; the perhalovinyl hydrocarbon ethers; and the vinyl and halovinyl esters of the hydrocarbon monocarboxylic acids. In these coreactants, as in the dihalotetrafluorobutanones, the halogen can be of atomic number from 9 to 35, alike or different, i.e., inclusive of fluorine, chlorine, and bromine, preferably the first two and most especially fluorine. The monovalent hydrocarbon radicals free of aliphatic unsaturation referred to above are specifically inclusive of the monovalent alkyl, aryl, alkaryl, aralkyl, and cycloalkyl hydrocarbon radicals.

Suitable specific illustrations of useful monoethylenically-unsaturated oxygen-containing coreactants within the genus just defined include the vinyl esters of the cycloaliphatic monocarboxylic acids, such as vinyl cyclohexanecarboxylate; the perhalovinyl alkaryl hydrocarbon ethers, such as 2,2-dichloro-1-fluorovinyl p-ethylphenyl ether; the halovinyl esters of the monocarboxylic aliphatic acids, such as perfluorovinyl n-nonanoate; ketene and the haloketenes, such as dichloroketene; the perhalovinyl aliphatic hydrocarbon ethers, such as perfluorovinyl octyl ether; the halovinyl aromatic monocarboxylic acid esters, such as 2,2-dibromo-1-fluorovinyl benzoate; and the like.

While mixtures of the various 2,2-dihalo-3,3,4,4-tetrafluorocyclobutanone and monoethylenically-unsaturated oxygen-containing coreactants can be used, this will result in the formation of mixed products of closely related structures which are difficult to separate and purify. Accordingly, in any one preparation it is preferred to use only one 2,2-dihalo-3,3,4,4-tetrafluorocyclobutanone and only one monoethylenically-unsaturated oxygen-containing coreactant of the types just previously described.

Using the cycloaddition reaction conditions outlined in the foregoing, there will be obtained from the specific polyfluoroperhalocyclobutanone and monoethylenically unsaturated oxygen-containing coreactants just discussed generically and illustrated with suitable specific examples additional 1-oxaspiro[3.3]heptanes of the present invention. More specifically, from perfluorocyclobutanone and vinyl cyclohexanecarboxylate there is obtained 2-cyclohexylcarbonyloxy-5,5,6,6,7,7 - hexafluoro - 1 - oxaspiro[3.3]heptane. From 2-bromo - 2,3,3,4,4-pentafluorocyclobutanone and 2,2-dichloro-1-fluorovinyl p-ethylphenyl ether there is obtained 5-bromo-3,3-dichloro-2,5,6,6,7,7-hexafluoro - 2 - (p-ethylphenyloxy) - 1 - oxaspiro[3.3]heptane. From 2-chloro - 2,3,3,4,4-pentafluorocyclobutanone and perfluorovinyl nonanoate there is obtained 5 - chloro - 2,3,3,5,6,6,7,7 - octafluoro-2-nonanoyloxy - 1 - oxaspiro[3.3]heptane. From 2,2-dibromo-3,3,4,4-tetrafluorocyclobutanone and dichloroketene there is obtained 5,5-dibromo-3,3-dichloro-6,6,7,7-tetrafluoro-1-oxa - 2 - oxaspiro[3.3]heptane. From 2,2-dichloro-3,3,4,4-tetrafluorocyclobutanone and perfluorovinyl n-octyl ether there is obtained 5,5-dichloro-2,3,3,6,6,7,7-heptafluoro - 2 - n - octyloxy - 1 - oxaspiro[3.3]heptane. From 2-bromo-2-chloro - 3,3,4,4 - tetrafluorocyclobutanone and 2,2-dibromo-1-fluorovinyl benzoate there is obtained 3,3,5-tribromo-5-chloro-2,6,6,7,7 - pentafluoro-2-benzoyl-1-oxaspiroheptane.

The new compounds of the present invention are generically useful as solvents for highly fluorinated polymers, for instance, the fluorinated olefins or more precisely the polymers of polyfluorinated olefins. Solutions of such polymers, e.g., polytetrafluoroethylene, polychlorotrifluoroethylene, and the like, in these products are readily obtained by heating the polymer at approximately 1–10% weight concentration in the tetrafluorodihalooxaspiroheptanes, generally at the reflux. Such solutions are useful in rendering waterproof and water repellent such shaped objects of cellulose as paper, wood, and the like, as well as in forming films and fibers and other shaped products of the polyfluorinated olefin polymers. In addition to their excellent waterproof and water repellent-rendering properties, solutions of these polyfluorinated olefin polymers are also useful in rendering such shaped objects of cellulose nonsupportive of combustion or markedly decreasing the tendency such materials normally have for burning. More specifically:

EXAMPLE A

*Use of Tetrafluorodihalooxaspiroheptanes Compounds as Solvents*

An approximately 10% by weight solution of a low molecular weight, relatively low melting tetrafluoroethylene polymer (melting range, 83–150° C.) in the 2,3,3,5,5,6,6,7,7-nonafluoro-2-methoxy - 1 - oxaspiro[3.3]heptane of Example I was prepared by heating the polymer in the liquid at the reflux. Strips of filter paper were immersed in the hot solution, removed, and the liquid solvent completely removed therefrom by treatment with acetone. The thus treated strips were then dried, and on testing it was found that the treated strips were water repellent and somewhat resistant to burning. In contrast, of course, untreated control strips of samples of the same filter paper were rapidly and completely wet on contact with water and, furthermore, burned rapidly when subjected to a flame. The hot solution of the tetrafluoroethylene polymer in the nonafluoro-2-methoxy-1-oxaspiro[3.3]heptane, on cooling, set to a solid opaque gel plug of the polymer in the liquid. The same results were obtained using the 2-acetyloxy - 5,5,6,6,7,7-hexafluoro-1-oxaspiro[3.3]heptane of Example III, the 2-benzoyloxy-5,5,6,6,7,7-hexafluoro-1-oxaspiro[3.3]heptane of Example IV, and the 5,5,6,6,7,7 - hexafluoro-2-propionyloxy-1-oxaspiro[3.3]heptane of Example V.

Since obvious modifications in the invention will be evident to those skilled in the chemical arts, I propose to be bound solely by the appended claims.

The embodiments of the invention in which an exclusive property or privilege is claimed are defined as follows.

I claim:

1. A compound of the formula

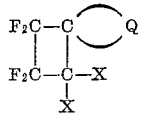

wherein X is halogen of atomic number 9–35 and Q is the radical

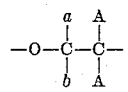

A being selected from the group consisting of hydrogen and halogen of atomic number 9–35 and valence bonds $a$ and $b$ being satisfied by a member of the group consisting of (1) one doubly bonded oxygen, (2) one OR and one X, R being monovalent hydrocarbon of up to 8 carbons free of aliphatic unsaturation and X being as defined above, with the proviso that both A's are halogen, and (3) one OCOR and one A, R and A being as defined above.

2. A 5,5-dihalo - 6,6,7,7 - tetrafluoro-2-oxo-1-oxaspiro[3.3]heptane.

3. 5,5,6,6,7,7-hexafluoro-2-oxo-1-oxaspiro[3.3]heptane.

4. A 5,5 - dihalo - 2 - hydrocarbonoxy-6,6,7,7-tetrafluoro-1-oxaspiro[3.3]heptane.

5. 2,3,3,5,5,6,6,7,7-nonafluoro - 2 - methoxy-1-oxaspiro[3.3]heptane.

6. 2-benzoyloxy-5,5,6,6,7,7-hexafluoro-1-oxaspiro[3.3]heptane.

7. 5,5,6,6,7,7-hexafluoro - 2 - propionyloxy-1-oxaspiro[3.3]heptane.

8. 5 - chloro - 2,3,3,5,6,6,7,7-octafluoro-2-methoxy-1-oxaspiro[3.3]heptane.

9. A 5,5-dihalo - 2 - hydrocarboncarbonyloxy-6,6,7,7-tetrafluoro-1-oxaspiro[3.3]heptane.

10. 2 - acetyloxy - 5,5,6,6,7,7 - hexafluoro-1-oxaspiro[3.3]heptane.

11. The process of preparing a 5,5-dihalo-6,6,7,7-tetrafluoro-1-oxaspiro[3.3]heptane which comprises reacting together a 2,2 - dihalo-3,3,4,4 - tetrafluorocyclobutanone and a coreactant carrying a single terminal carbon-carbon ethylenic double bond in which one and only one of the doubly-bonded ethylenic carbons is directly bonded to oxygen, said coreactant being selected from the class consisting of ketenes, vinyl ethers and vinyl esters.

12. The process of claim 11 employing perfluoro-cyclobutanone.

13. The process of preparing 5,5,6,6,7,7-hexafluoro-2-oxo-1-oxaspiro[3.3]heptane which comprises reacting together perfluorocyclobutanone and ketene.

14. The process of preparing 2,3,3,5,5,6,6,7,7-nonafluoro-2-methoxy-1-oxaspiro[3.3]heptane which comprises reacting together perfluorocyclobutanone and methyl trifluorovinyl ether.

15. The process of preparing 2-benzoyloxy-5,5,6,6,7,7-hexafluoro-1-oxaspiro[3.3]heptane which comprises reacting together perfluorocyclobutanone and vinyl benzoate.

16. The process of preparing 5,5,6,6,7,7-hexafluoro-2-propionyloxy-1-oxaspiro[3.3]heptane which comprises reacting together perfluorocyclobutanone and vinyl propionate.

17. The process of preparing 2-acetyloxy-5,5,6,6,7,7-hexafluoro-1-oxaspiro[3.3]heptane which comprises reacting together perfluorocyclobutanone and vinyl acetate.

18. The process of claim 11 employing 2-chloro-2,3,3,4,4-pentafluorocyclobutanone.

19. The process of preparing 5-chloro-2,3,3,5,6,6,7,7-octafluoro-2-methoxy-1-oxaspiro[3.3]heptane which comprises reacting together 2-chloro-2,3,3,4,4-pentafluorocyclobutanone and methyl trifluorovinyl ether.

References Cited in the file of this patent

Hackh's Chemical Dictionary, 3rd ed., page 418 (1944), The Blakiston Company.